(12) United States Patent
Brindeau et al.

(10) Patent No.: US 10,967,988 B2
(45) Date of Patent: Apr. 6, 2021

(54) MACHINERY SYSTEM INTENDED FOR THE MANIPULATION OF AT LEAST ONE UPPER MODULE AND/OR AT LEAST ONE LOWER MODULE

(71) Applicant: AIRBUS SAS, Blagnac (FR)

(72) Inventors: Jean-Mickael Brindeau, Blagnac (FR); André Aquila, Cornebarrieu (FR)

(73) Assignee: AIRBUS SAS, Blagnac (FR)

( * ) Notice: Subject to any disclaimer, the term of this patent is extended or adjusted under 35 U.S.C. 154(b) by 191 days.

(21) Appl. No.: 16/167,828

(22) Filed: Oct. 23, 2018

(65) Prior Publication Data

US 2019/0118976 A1 Apr. 25, 2019

(30) Foreign Application Priority Data

Oct. 24, 2017 (FR) ...................................... 1760040

(51) Int. Cl.
  *B64F 5/10* (2017.01)
  *B64F 5/50* (2017.01)
  *B64C 1/18* (2006.01)
  *B66C 19/00* (2006.01)
  *B66F 9/075* (2006.01)

(52) U.S. Cl.
  CPC .................. *B64F 5/10* (2017.01); *B64F 5/50* (2017.01); *B64C 1/18* (2013.01); *B64D 2221/00* (2013.01); *B66C 19/00* (2013.01); *B66F 9/0755* (2013.01)

(58) Field of Classification Search
  CPC ..... B64F 5/10; B64F 5/50; B64C 1/18; B64D 2221/00; B66C 9/0755; B66C 17/00; B66C 5/00; B66C 23/00
  See application file for complete search history.

(56) References Cited

U.S. PATENT DOCUMENTS

| 3,709,322 A | 1/1973 | Mitchell |
| 4,927,595 A * | 5/1990 | Kaufmann ............... B66C 17/00 376/268 |
| 5,507,091 A * | 4/1996 | Bullen ................... B23P 21/004 269/290 |
| 2001/0054228 A1 | 12/2001 | Lehmker et al. |

(Continued)

FOREIGN PATENT DOCUMENTS

| AU | 1443070 A | 11/1971 | |
| DE | 102014019465 A1 * | 6/2016 | ............. B66C 23/26 |

(Continued)

OTHER PUBLICATIONS

French Search Report; priority document.

*Primary Examiner* — Lawrence Averick
(74) *Attorney, Agent, or Firm* — Greer, Burns & Crain, Ltd.

(57) ABSTRACT

The machinery system comprises an arm having an upper fixing device arranged to fix to the arm at least one upper module to be manipulated in an upper plane and a lower fixing device arranged to fix to the arm at least one lower module to be manipulated in a lower plane; a first securing device of the arm configured to control the positioning of the arm; the arm being mounted cantilever-fashion on the first securing device. The machinery system makes it possible to at least halve the manipulation time for two modules by virtue of the arm mounted cantilever-fashion, to which two modules can be fixed.

15 Claims, 3 Drawing Sheets

(56) References Cited

U.S. PATENT DOCUMENTS

| | | | |
|---|---|---|---|
| 2006/0180704 A1* | 8/2006 | Olson | B64F 5/50 244/119 |
| 2009/0313830 A1 | 12/2009 | Bisiach et al. | |
| 2014/0332640 A1 | 11/2014 | Breuer et al. | |
| 2017/0247121 A1 | 8/2017 | Guering | |
| 2017/0369287 A1* | 12/2017 | Krupinski | B66C 15/065 |

FOREIGN PATENT DOCUMENTS

| | | |
|---|---|---|
| EP | 2809580 B1 | 12/2014 |
| FR | 3048235 A1 | 9/2017 |
| WO | 2008010159 A2 | 1/2008 |

* cited by examiner

MACHINERY SYSTEM INTENDED FOR THE MANIPULATION OF AT LEAST ONE UPPER MODULE AND/OR AT LEAST ONE LOWER MODULE

CROSS-REFERENCES TO RELATED APPLICATIONS

This application claims the benefit of the French patent application No. 1760040 filed on Oct. 24, 2017, the entire disclosures of which are incorporated herein by way of reference.

TECHNICAL FIELD

The present invention relates to a machinery system for the manipulation of at least two modules on a surface.

BACKGROUND OF THE INVENTION

Assembling an aircraft can include the precise manipulation of modules in confined and narrow housings. Generally, this manipulation of modules requires the assembly and dismantling of systems allowing this manipulation.

The document FR 3 048 235 describes a machinery system allowing the manipulation of modules, such as the introduction of a floor into an aircraft fuselage. This machinery system requires the assembly and the dismantling of upper beams in the aircraft, the assembly and the dismantling of lower beams on the module to be introduced and the assembly and the dismantling of support elements linking the lower beams to the upper beams. Moreover, it does not allow more than one module to be manipulated at a time. These requirements generally result in significant assembly times.

SUMMARY OF THE INVENTION

An object of the present invention is to mitigate these drawbacks by proposing a machinery system contributing to reducing the assembly time without sacrificing the demands for accuracy in the manipulation of the modules.

To this end, the invention relates to a mobile machinery system intended for the manipulation on a displacement surface of at least one upper module and/or at least one lower module to be introduced into a housing.

According to the invention, the machinery system comprises:

an arm having an upper fixing device arranged to fix to the arm in an upper plane at least one upper module to be manipulated and a lower fixing device arranged to fix to the arm in a lower plane at least one lower module to be manipulated, the arm being intended to be introduced into the housing with the upper module or modules and/or the lower module or modules;

a first securing device of the arm intended to control the positioning of the arm;

the arm being mounted cantilever-fashion on the first securing device.

Thus, by virtue of the arm mounted cantilever-fashion on the first securing device, the machinery system makes it possible to manipulate at least one module without the need to assemble and dismantle elements of the machinery system in the aircraft.

For example, the first securing device comprises a hexapod platform on which the arm is mounted.

Advantageously, the arm comprises:

a central part, a second securing device intended to fix the lower fixing device to the central part, a third securing device intended to fix the upper fixing device to the central part.

According to a particular feature, the second securing device comprises a first plurality of actuators and the third securing device comprises a second plurality of actuators.

According to another particular feature, the machinery system comprises at least one inclination sensor intended to generate signals representative of the inclination of the upper plane and of the lower plane relative to the displacement plane, the first securing device and/or the pluralities of actuators being arranged to control the inclination of the upper plane and of the lower plane relative to the displacement plane based on the signals representative of the inclination of the upper plane and of the lower plane relative to the displacement plane.

Furthermore, the machinery system comprises at least one deformation sensor intended to generate signals representative of the deformation of the lower module or modules fixed to the lower fixing device and/or of the upper module or modules fixed to the upper fixing device, the first plurality of actuators being arranged to adjust the geometry of the lower module or modules fixed to the lower fixing device based on the signals representative of the deformation of the lower module or modules fixed to the lower fixing device, the second plurality of actuators being arranged to adjust the geometry of the upper module or modules fixed to the upper fixing device based on the signals representative of the deformation of the upper module or modules fixed to the upper fixing device.

Moreover, the lower fixing device comprises a grating fixed to a central part of the arm by the second plurality of actuators, the grating being intended to fix one or more lower modules to be manipulated.

Furthermore, the upper fixing device comprises a plurality of supports fixed to a central part of the arm by the first plurality of actuators, the plurality of supports being intended to fix one or more upper modules to be manipulated.

According to another particular feature, the machinery system further comprises a rolling device for the machinery system intended to displace and guide the machinery system on the displacement surface, the first securing device of the arm being mounted between the arm and the rolling device.

Furthermore, the machinery system further comprises at least one distance sensor intended to generate signals representative of a distance between, on the one hand, the upper module or modules and/or the lower module or modules fixed to the arm and/or the machinery system and, on the other hand, the housing, the rolling device and the first securing device being arranged to control the positioning of the lower module or modules and/or of the upper module or modules relative to the housing to insert the module or modules into the housing.

Advantageously, the arm comprises a walkway intended to receive at least one operator.

The invention relates also to a method for using the machinery system as described above to introduce at least one upper module and/or at least one lower module into a housing in order to be fixed in the housing.

According to the invention, the method comprises at least the following two steps:

a step of fixing of the upper module or modules to the arm, in the upper plane, by the upper fixing device;

a step of fixing of the lower module or modules to the arm, in the lower plane, by the lower fixing device;

the method also comprising at least one step of positioning of the arm by the first securing device to introduce the module or modules into the housing.

Furthermore, the method comprises a step of adjustment of the geometry of the lower module or modules by the second securing device using the first plurality of actuators and/or a step of adjustment of the geometry of the upper module or modules by the third securing device using the second plurality of actuators.

In addition, the method also comprises:

a step of displacement of the machinery system by the rolling device so that the machinery system is brought to the entry of the housing;

a step of introduction and of alignment of the upper module or modules and/or of the lower module or modules consisting in aligning the upper module or modules and/or the lower module or modules relative to the housing using the securing device and of introduction of the upper module or modules and/or of the lower module or modules using the rolling device.

Moreover, the method comprises:

a step of positioning in the housing of the upper module or modules and/or of the lower module or modules, and a step of fixing in the housing of the upper module or modules and/or of the lower module or modules.

BRIEF DESCRIPTION OF THE DRAWINGS

The invention, with its features and advantages, will emerge more clearly on reading the description given with reference to the attached drawings in which.

DETAILED DESCRIPTION

The rest of the description will refer to the figures cited above.

Figure 1:
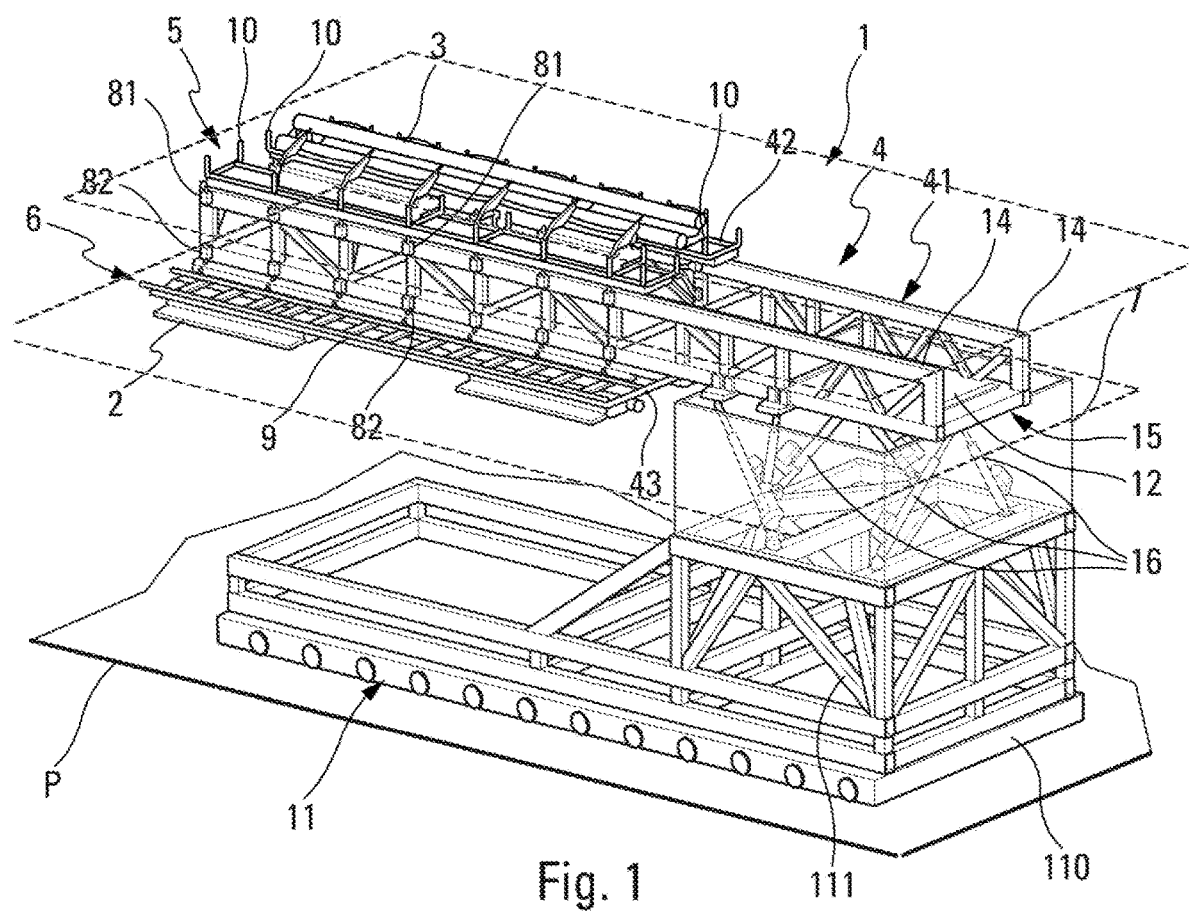
FIG. 1 represents a perspective view of an embodiment of the machinery system.
Figure 2:
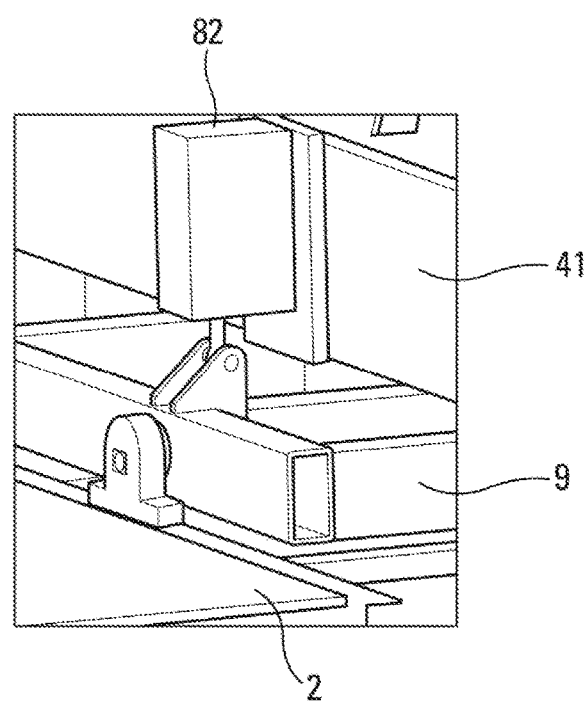
FIG. 2 represents a detail of the machinery system in perspective, in particular, the arrangement of an actuator of the machinery system.
Figure 3:
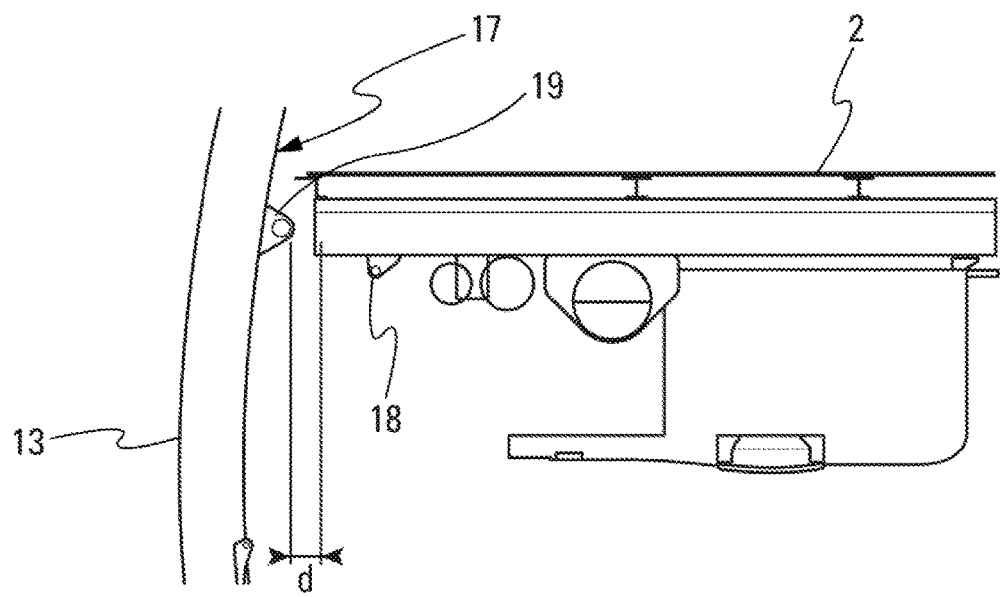
FIG. 3 represents a transverse cross section of the machinery system showing a lower module in the vicinity of a housing at the moment of introduction of the lower module into the housing.
Figure 4:
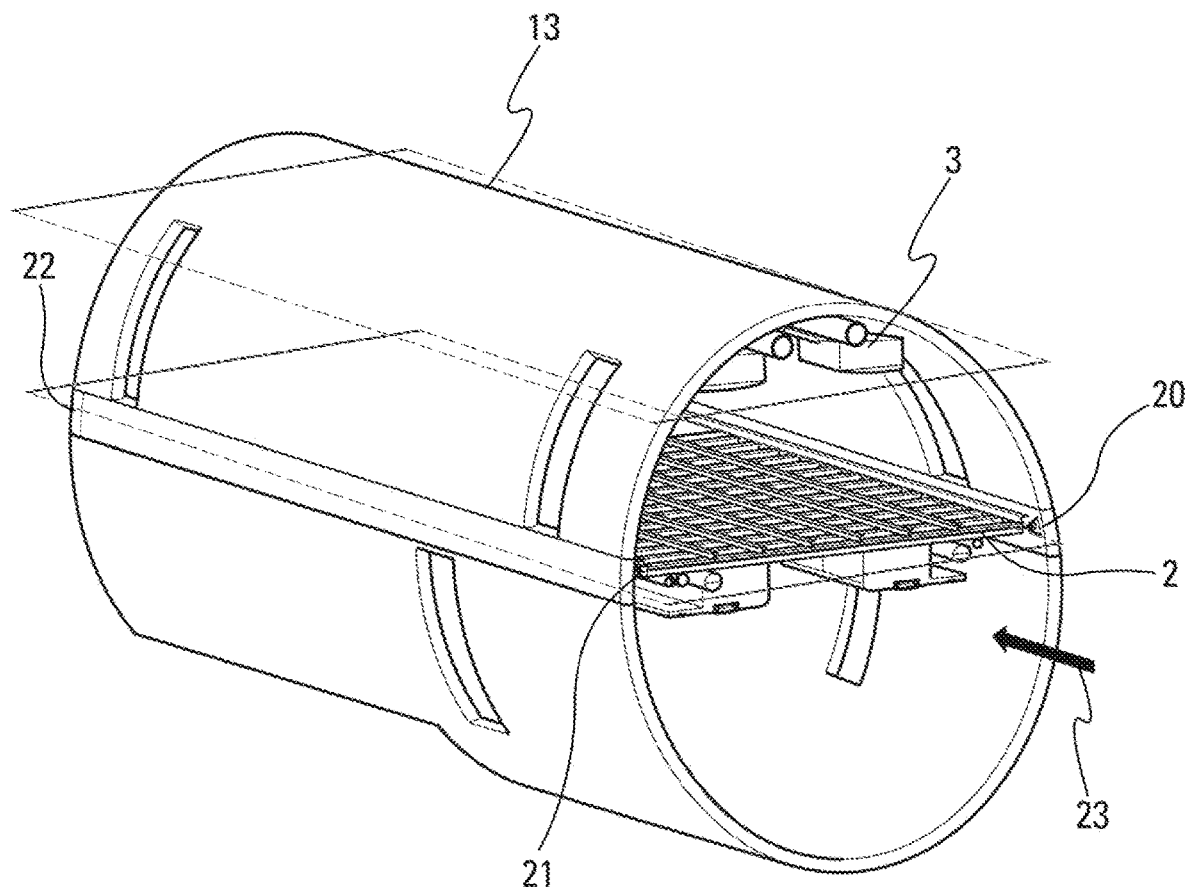
FIG. 4 represents a perspective view showing the lower and upper modules fixed in the housing.
Figure 5:
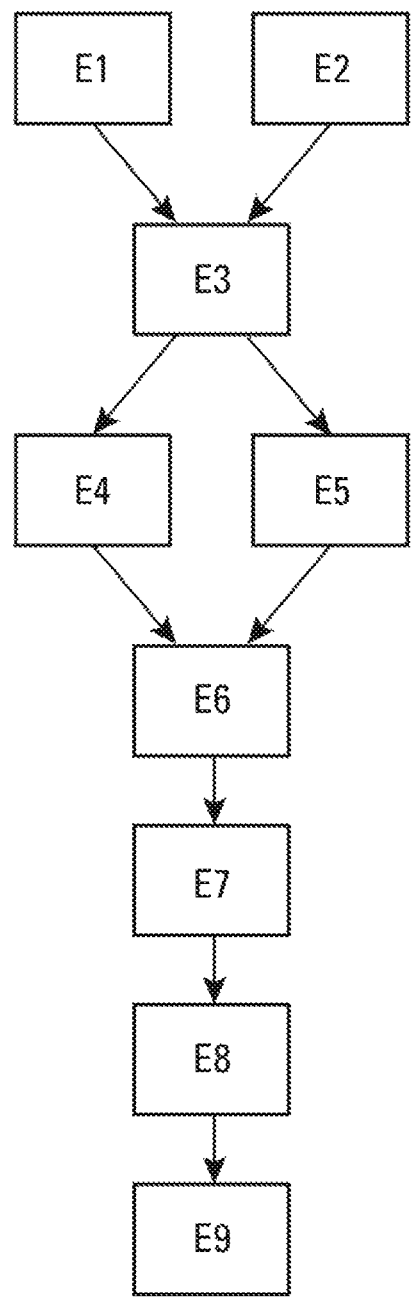
FIG. 5 represents a schematic flow diagram of the method for using the machinery system.

FIG. 1 represents an embodiment of the machinery system 1 configured for the manipulation of modules 2, 3.

The machinery system 1 is mobile.

It makes it possible to manipulate, on a displacement surface P, for example a horizontal plane, in particular:

at least one upper module 3 or at least one lower module 2 to be introduced into a housing 13, such as an airplane fuselage, or else, at least one upper module 3 and at least one lower module 2 to be introduced into a housing 13.

A lower module 2 can correspond to an aircraft floor.

An upper module 3 can correspond to an upper part ("crown") fixed to the top of a fuselage 13 allowing technical ducts or wiring to be run in the fuselage 13.

The machinery system 1 comprises a securing device 7 and an arm 4 mounted cantilever-fashion on the securing device 7 of the arm 4. The arm 4 is configured to be introduced into the housing 13 with the upper module or modules 3 and/or the lower module or modules 2. The fact that the arm 4 is mounted cantilever-fashion facilitates the introduction of the modules 2 and/or 3 into the housing 13.

The arm 4 has an upper fixing device 5 arranged to fix to the arm 4, in an upper plane, at least one upper module 3 to be manipulated and a lower fixing device 6 arranged to fix to the arm 4, in a lower plane, at least one lower module 2 to be manipulated.

During the manipulation of the module or modules 2 and/or 3, the arm 4 makes it possible to introduce into the housing 13 the upper module or modules 3 and/or the lower module or modules 2.

Preferably, the arm 4 has a significant rigidity in order for it to not exhibit significant deflection caused by its own weight.

Advantageously, the arm 4 comprises a walkway 12 configured to receive at least one operator.

According to an embodiment, illustrated by FIG. 1, the arm 4 is generally U-shaped. It comprises a web forming the base of the U and two parallel wings 14 forming the legs of the U. The web is configured to act as walkway 12. The wings 14 each form a mechanically welded lattice assembly making it possible to obtain a great rigidity of the arm 4.

The securing device 7 of the arm 4 is, in particular, configured to control the positioning of the arm 4.

In a nonlimiting manner, the securing device 7 makes it possible to control the transverse and/or longitudinal inclination of the arm 4 relative to the displacement plane P. Thus, the securing device 7 allows lateral, vertical and torsional corrective movements of the arm 4.

In the embodiment of FIG. 1, the securing device 7 comprises a hexapod platform on which the arm 4 is mounted. The hexapod platform is formed by a platform 15 on which are mounted the arm 4 and six linear actuators 16 making it possible to vary the orientation of the platform 15 by six degrees of freedom.

According to an embodiment, the arm 4 comprises:

a central part 41, a securing device 43 configured to fix the lower fixing device 6 of the arm 4 (in the lower plane) to the central part 41, a securing device 42 configured to fix the upper fixing device 5 of the arm 4 (in the upper plane) to the central part 41.

Despite the rigidity of the arm 4, there can be a deflection thereof. This deflection is generally caused by the specific weight of the arm 4 mounted cantilever-fashion. The weight of the module or modules 2, 3 fixed onto the arm 4 can also contribute to the deflection of the arm 4.

The securing device 42 and the securing device 43 can compensate for this deflection of the arm 4.

In a preferred embodiment, the securing device 42 comprises a plurality of actuators 81 and the securing device 43 comprises a plurality of actuators 82.

The actuators 81 and 82 can be manual or automatic.

Advantageously, the machinery system 1 comprises at least one inclination sensor (not represented). This or these inclination sensor(s) is/are configured to generate signals representative of the inclination of the upper plane and of the lower plane (therefore of the upper module or modules 3 and/or of the lower module or modules 2) relative to the displacement plane P. The securing device 7 and/or the pluralities of actuators 81 and 82 are arranged to control the inclination of the upper plane and of the lower plane with the displacement surface P based on the signals representative of the inclination of the upper plane and of the lower plane relative to the displacement plane P. Thus, when the inclination of the lower plane and of the upper plane measured by the inclination sensor or sensors does not correspond to a desired inclination, the securing device 7 and/or the pluralities of actuators 81 and 82 are activated to move the arm 4 until the inclination sensor or sensors measure an inclination which corresponds to the desired inclination.

In the embodiment represented in FIG. 1, the inclination sensor or sensors send a signal to the hexapod platform and/or to the pluralities of actuators 81 and 82. If the inclination does not correspond to the desired inclination, the actuators 16 of the hexapod platform and/or the actuators of the pluralities of actuators 81 and 82 are activated until the inclination sensor or sensors measure an inclination corresponding to the desired inclination. The inclination measurements determined by the inclination sensor or sensors and the desired inclination can be sent to a computer which generates commands which allow the arm to have an inclination corresponding to the desired inclination based on the inclination which has been measured by the inclination sensor or sensors. These commands are then sent to the hexapod platform and/or to the pluralities of actuators 81 and 82. The actuators 16 of the hexapod platform and/or the actuators of the pluralities of actuators 81 and 82 are thus activated as a function of the commands.

Advantageously, the machinery system 1 comprises at least one deformation sensor (not represented) configured to generate signals representative of the deformation of the lower module or modules 2 fixed to the lower fixing device 6 and/or of the upper module or modules 3 fixed to the upper fixing device 5.

The plurality of actuators 82 can also be arranged to adjust the geometry of the lower module or modules 2 fixed to the lower fixing device 6 based on the signals representative of the deformation of the lower module or modules 2 fixed to the lower fixing device 6.

Similarly, the plurality of actuators 81 can be arranged to adjust the geometry of the upper module or modules 3 fixed to the upper fixing device 5 based on the signals representative of the deformation of the upper module or modules 3 fixed to the upper fixing device 5.

Thus, after the lower module or modules 2 have been fixed to the lower fixing device 6 and/or the upper modules 3 have been fixed to the upper fixing device 5, the plurality of actuators 82 and/or the plurality of actuators 81 adjusts the geometry of the lower module or modules 2 and/or of the upper module or modules 3 in order for the lower module or modules and/or the upper modules 3 to have an ideal geometry, for example a flatness that is sufficient for the insertion of the lower module or modules 2 and/or of the upper module or modules 3 into the housing 13. Each of the actuators 82 of the plurality of actuators 82 and each of the actuators 81 of the plurality of actuators 81 are also configured to be able to be activated locally in order to be able to align one or more fixing elements 18 of the lower module or modules 2 to the fixing element or elements 19 of the housing 13 configured to be fixed to the fixing elements 18 of the lower module or modules 2.

Each actuator 81 or 82 acts individually in order to locally compensate for the deflection or the deformations of the aim. The geometry of the module or modules 2 and/or 3 is therefore maintained by the pluralities of actuators 81 or 82 which act so that the deflection or the deformations of the arm 4 are compensated by their activation.

If the rigidity of the arm 4 is sufficient for it not to be deformed by its own weight and/or by the weight of the module or modules 2 and/or 3, the implementation of the pluralities of actuators 81 and 82 is not necessary to compensate for the deformation of the arm 4.

In the embodiment of FIG. 1, the actuators 81, 82 are evenly distributed along the arm 4.

Advantageously, the number of deformation sensors and the number of actuators 81 or 82 necessary to maintain the geometry of the lower module or modules 2 and/or of the upper module or modules 3 is adapted as a function of the rigidity of the aim 4 and of the need for accuracy in the final positioning of the lower module or modules 2 and/or of the upper module or modules 3. This number can be equal to zero if the rigidity of the arm is sufficient for the desired accuracy. Conversely, the number of deformation sensors and of actuators 81 or 82 can be high to manipulate very long modules 2 or 3 which have to be positioned very accurately.

The lower fixing device 6 can comprise a grating 9 fixed to the central part 41 of the arm 4 by the plurality of actuators 82. The grating 9 is configured to fix one or more lower modules 2 to be manipulated.

Similarly, the upper fixing device 5 can comprise a plurality of supports 10 fixed to the central part 41 of the arm 4 by the plurality of actuators 81. The plurality of supports 10 is configured to fix one or more upper modules 3 to be manipulated.

In order to displace the machinery system 1, the latter also comprises a rolling device 11 for the machinery system 1 configured to displace and guide the machinery system 1 on the displacement surface P. The securing device 7 of the arm 4 is mounted between the arm 4 and the rolling device 11.

The rolling device 11 can also comprise a rolling platform 110 topped by a mechanically welded assembly 111 to which is fixed the securing device 7. The rolling platform 110 is, for example, mounted on wheels.

The displacement of the machinery system 1 by the rolling device 11 can be performed manually, automatically or by remote control.

Advantageously, the machinery system 1 also comprises at least one distance sensor (not represented) or otherwise called proximity sensor, configured to generate signals representative of a distance d between, on the one hand, the upper module or modules 3 and/or the lower module or modules 2 fixed to the arm and, on the other hand, the housing 13. The distance sensor or sensors can also be configured to generate signals representative of the distance d between the machinery system 1 and the housing 13. The rolling device 11 and the first securing device 7 are also arranged to control the positioning of the lower module or modules 3 and/or of the upper module or modules 2 and/or of the machinery system 1 relative to the housing 13 based on the signals representative of a distance. Thus, when the distance d between, on the one hand, the module or modules 2 and/or 3 and/or the machinery system and, on the other hand, the housing 13 is less than a predetermined distance, the rolling device 11 and the securing device 7 modifies the positioning of the module or modules 2 and/or 3 and/or of the machinery system 1 in order for the distance d to be greater than the determined distance. In the same way as for the inclination sensor or sensors, the distance measurements d determined by the distance sensor or sensors can be sent to a computer which generates commands which allow the arm to have a positioning corresponding to a positioning of the arm 4 for which the distance d between, on the one hand, the module or modules 2 and/or 3 and/or the machinery system 1 and, on the other hand, the housing 13 is greater than the predetermined distance. These commands are then sent to the hexapod platform and to the rolling device 11.

The actuators 16 of the hexapod platform are thus activated as a function of the commands. Similarly, the rolling device 11 displaces the machinery system 1 as a function of the commands.

For example, the distance sensor or sensors correspond to laser sensors placed on the arm 4 which control the distance between the machinery system 1 and the fuselage using a reference rule positioned on the fuselage.

The machinery system 1 can be used to introduce at least one upper module 3 and at least one lower module 2 simultaneously into a housing 13 in order to be fixed in the housing 13. The machinery system 1 can also be used to introduce a single module: either an upper module 3 or a lower module 2.

The housing 13 can correspond to the fuselage of an aircraft. In addition, as described previously, the lower module 2 can correspond to an aircraft floor. The upper module 3 can correspond to an upper part fixed to the top of the fuselage allowing technical ducts or wiring to be run in the fuselage.

The method comprises at least one of the following two steps:

a step E1 of fixing of the upper module or modules 3 to the arm 4, in the upper plane, by the upper fixing device 5;

a step E2 of fixing of the lower module or modules 2 to the arm 4, in the lower plane, by the lower fixing device 6.

The method also comprises at least one step E3 of positioning of the arm 4 by the securing device 7 to introduce the module or modules 2 and/or 3 into the housing 13.

The step E1 of fixing of the upper module or modules 3 can be performed simultaneously with the step E2 of fixing of the lower module or modules 2.

The method can also comprise a step E5 of adjustment of the geometry of the upper module or modules 3 by the securing device 42.

Similarly, the method can comprise a step E4 of adjustment of the geometry of the lower module or modules 2 by the securing device 43.

These adjustment steps E4 and E5 make it possible to adjust the geometry of the modules 2 or 3 in order for them not to undergo a deformation caused by a possible deflection of the arm 4. The pluralities of actuators 81 or 82 of the securing devices 42 or 43 locally compensate for the possible deflection of the arm 4.

Advantageously, the method also comprises a step E6 of displacement of the machinery system 1 by the rolling device 11 in order for the machinery system to be brought to the entry of the housing 13 for the lower module or modules 2 and/or the upper module or modules 3 to be ready to be introduced into the housing 13.

During the displacement step E6, the rolling device 11 can be implemented automatically.

In order to guarantee a safe introduction of the modules 2, 3 into the housing 13, the distance d between the modules 2, 3 and the internal walls 17 of the housing 13 upon the introduction of the modules 2, 3 is controlled by virtue of the action of the securing device 7 and of the rolling device 11. The securing device 7 ensures corrective lateral, vertical and torsional movements and the rolling device 11 ensures corrective lateral and longitudinal movements in order for the distance d to not be less than a predetermined distance. In a nonlimiting manner, the distance d between the modules and the housing is not less than 50 mm along the modules 2, 3. The action of the securing device 7 and of the rolling device 11 also makes it possible to take account of the distance d between the machinery system 1 and the housing 13.

For that, the method can comprise a step E7 of introduction and of alignment of the upper module or modules 3 and/or of the lower module or modules 2. The step E7 consists in aligning the upper module or modules 3 and/or the lower module or modules 2 relative to the housing using the first securing device 7. The distance sensor or sensors make it possible for the lower module or modules 2 and/or the upper modules 3 and/or the machinery system 1 not to strike the housing 13 during the introduction of the modules 2 and/or 3 into the housing. The step E7 also consists in the introduction of the upper module or modules 3 and/or of the lower module or modules 2 using the rolling device 11.

After the modules 2, 3 have been introduced completely into the housing 13, the method then comprises a step E8 of positioning in the housing 13 of the upper module or modules 3 and/or of the lower module or modules 2.

The positioning of the modules 2, 3 is performed accurately in order for the fixing elements 18 of the modules 2, 3 to be aligned with the fixing elements 19 of the internal wall 17 of the housing 13 according to a tolerance threshold defined by the fixing type.

The positioning is first of all ensured by the securing device 7 which aligns a few fixing elements 18 of the modules 2, 3 with the fixing elements 19 of the internal wall 17 of the housing 13.

Then, each of the actuators 81, 82 of the pluralities of actuators of the securing device 42 and of the securing device 43 can be actuated individually by an operator in order to locally adjust the positions of all the fixing elements 18 of the modules 2 or 3 relative to the fixing elements 19 of the internal wall 17 of the housing 13. The adjustment can be of the order of 1 mm to 2 mm depending on the fixing elements 18 or 19.

According to an example, the actuation is performed remotely from a portable tablet.

According to another example, the actuation is performed manually. In the case of manual actuation, the adjustment can be performed using a manual adjustment thumb wheel.

According to an embodiment, the securing device 7 allows the accurate alignment of three fixing elements 18 of the modules with three fixing elements 19 of the internal wall 17 of the housing 13 by using the six degrees of freedom provided by the securing device 7. For example, the three fixing elements 18 correspond, respectively, to two fixing elements 20, 21 at the entry of the housing 13 and to a fixing element 22 at the exit from the housing 13 in the direction of introduction 23 of the modules 2, 3. The other fixing elements 18 of the modules 2 or 3 are brought close to the other fixing elements 19 by local actuation of the actuators 81, 82.

The modules 2 or 3 are then ready to be fixed onto the internal wall 17 of the housing 13 during a fixing step E9 of the method. For the fixing step E9, operators can enter into the housing 13 in order to fix the modules 2 or 3 onto the internal wall 17 of the fuselage. The walkway 12 of the arm 4 allows the operators to reach the fixing elements 19 of the upper module 3.

The fixing of the lower module or modules 2 can be performed simultaneously with the fixing of the upper module or modules 3.

According to a preferred embodiment, in order to stabilize the walkway 12, the lower module or modules 2 are previously fixed to the housing 13 with a few fixing elements of the lower module or modules. The operators can then rejoin the elements of the upper module or modules 3 to fix the upper module or modules 3 to the housing 13.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mobile machinery system configured for a manipulation, on a displacement surface, of at least one upper module and at least one lower module to be introduced into a housing, comprising:
   an arm having an upper fixing device arranged to fix to the arm, in an upper plane, the at least one upper module to be manipulated, and
   a lower fixing device arranged to fix to the arm, in a lower plane, the at least one lower module to be manipulated, the arm being configured to be introduced into the housing with the at least one upper module and the at least one lower module;
   a first securing device of the arm configured to control the positioning of the arm; and
   the arm being mounted on the first securing device forming a cantilever.

2. The system according to claim 1, wherein the first securing device comprises a hexapod platform on which the arm is mounted.

3. The system according to claim 1, wherein the arm comprises:
   a central part,
   a second securing device configured to fix the lower fixing device to the central part, and
   a third securing device configured to fix the upper fixing device to the central part.

4. The system according to claim 3, wherein the second securing device comprises a first plurality of actuators and the third securing device comprises a second plurality of actuators.

5. The system according to claim 4, further comprising at least one inclination sensor configured to generate signals representative of at least one of an inclination of the upper plane or of the lower plane relative to the displacement surface, the first securing device, or the pluralities of actuators being arranged to control the inclination of the upper plane and of the lower plane relative to the displacement surface based on signals representative of the inclination of the upper plane and of the lower plane relative to the displacement surface.

6. The system according to claim 4, further comprising:
   at least one deformation sensor configured to generate signals representative of the deformation of at least one of the at least one lower module fixed to the lower fixing device or of the at least one upper module fixed to the upper fixing device,
   the first plurality of actuators being arranged to adjust a geometry of the at least one lower module fixed to the lower fixing device based on the signals representative of a deformation of the at least one lower module fixed to the lower fixing device,
   the second plurality of actuators being arranged to adjust a geometry of the at least one upper module fixed to the upper fixing device based on the signals representative of a deformation of the at least one upper module fixed to the upper fixing device.

7. The system according to claim 4, wherein the lower fixing device comprises a grating fixed to the central part of the arm by the second plurality of actuators, the grating being configured to fix the at least one lower module to be manipulated.

8. The system according to claim 4, wherein the upper fixing device comprises a plurality of supports fixed to the central part of the arm by the first plurality of actuators, the plurality of supports being configured to fix the at least one upper modules to be manipulated.

9. The system according to claim 1, further comprising at least one distance sensor configured to generate signals representative of a distance between at least one of the at least one upper module or the at least one lower module fixed to the arm or the machinery system and the housing, a rolling device and the first securing device being arranged to control the positioning of at least one of the at least one lower module or the at least one upper module relative to the housing to insert the at least one upper or lower module into the housing.

10. The system according to claim 1, wherein the arm comprises a walkway configured to receive at least one operator.

11. A method for using the machinery system according to claim 1 to introduce at least one of the at least one upper module or the at least one lower module into the housing to be fixed in the housing, the method comprising at least one of the following two steps:
   fixing the at least one upper module to the arm, in the upper plane, by the upper fixing device;
   fixing the at least one lower module to the arm, in the lower plane, by the lower fixing device;
   the method also comprising at least one step of positioning of the arm by the first securing device to introduce the at least one upper or lower module into the housing.

12. The method according to claim 11, further comprising at least one of a step of adjusting a geometry of the at least one lower module by a second securing device using a first plurality of actuators or a step of adjusting a geometry of the at least one upper module by a third securing device using a second plurality of actuators.

13. The method according to claim 11, further comprising:
   displacing the machinery system by a rolling device so that the machinery system is brought to an entry of the housing;
   introducing and aligning the at least one upper or lower module comprising aligning the at least one upper or lower module relative to the housing using the first securing device and introducing the at least one upper or lower module using the rolling device.

14. The method according to claim 11, further comprising:
   positioning in the housing the at least one upper or lower module, and
   fixing in the housing the at least one upper or lower module.

15. A mobile machinery system configured for a manipulation, on a displacement surface, of at least one upper module and at least one lower module to be introduced into a housing, comprising:
- an arm having an upper fixing device arranged to fix to the arm, in an upper plane, the at least one upper module to be manipulated;
- a lower fixing device arranged to fix to the arm, in a lower plane, the at least one lower module to be manipulated, the arm being configured to be introduced into the housing with the at least one upper module and the at least one lower module;
- a first securing device of the arm configured to control the positioning of the arm, the arm being mounted on the first securing device forming a cantilever; and
- a rolling device for the machinery system configured to displace and guide the machinery system on the displacement surface, the first securing device of the arm being mounted between the arm and the rolling device.

* * * * *